United States Patent Office 3,094,533
Patented June 18, 1963

3,094,533
3-PYRIDYL-ACRYLONITRILES
George M. K. Hughes, Gales Ferry, Conn., assignor to Chas. Pfizer & Co., Inc., New York, N.Y., a corporation of Delaware
No Drawing. Filed Oct. 13, 1961, Ser. No. 144,845
16 Claims. (Cl. 260—294.9)

This invention relates to various acrylonitrile compounds in the stilbene series. More particularly, it is concerned with a variety of 3-(pyridyl)-acrylonitriles which have been found to be useful both as anti-fertility agents and as hypocholesterolemic agents.

The compounds with which the present invention is concerned are all represented by the following structural formula:

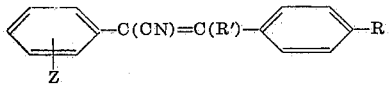

wherein Z is a member selected from the group consisting of hydrogen, lower alkyl, lower alkoxy, lower alkylmercapto, halogen, trifluoromethyl, nitro and alkanoyl having from two to four carbon atoms; R' is a member selected from the group consisting of pyridyl and lower alkyl-substituted pyridyl; and R is a member selected from the group consisting of hydrogen, lower alkyl, lower alkoxy and halogen; and the pharmaceutically acceptable acid addition salts thereof. Specific examples of such compounds include 3-(2-pyridyl)-3-phenyl-2-phenylacrylonitrile, 3 - (4 - pyridyl) - 3 - phenyl - 2 - (p - anisyl)acrylonitrile, 3 - (3 - pyridyl) - 3 - phenyl - 2 - (p - chlorophenyl)acrylonitrile, etc.

In accordance with the process employed for preparing these compounds, an appropriately substituted benzyl cyanide compound (i.e., a phenylacetonitrile) is condensed with a phenyl pyridyl ketone (i.e., a C-benzoylpyridine type compound) in the presence of a suitable basic condensing agent. The majority of either of these two type principal starting materials are known compounds, while the remainder can easily be prepared in accordance with standard organic procedures well-known to those skilled in the art. The condensation step itself is most desirably conducted in a reaction-inert organic solvent medium at a temperature ranging from about 20° C. up to about 150° C. for a period of about one-quarter of an hour to about five hours. Preferred reaction-inert organic solvents include such lower N,N-dialkyl derivatives of lower alkane hydrocarbon carboxamides as N,N-dimethylformamide, N,N - dimethylacetamide, N,N - diethylformamide, and the like, as well as aromatic hydrocarbon solvents like benzene, toluene, xylene, and so forth. The basic condensing agents employed in order to effect this reaction are generally alkali metal alkoxides like lithium methoxide, sodium ethoxide, potassium tert.-butylate, etc., or alkali metal amides such as lithium amide, sodamide, and the like. However, it is also possible to employ other type basic condensing agents as well, like lithium and sodium hydride, and calcium hydride, for example. The amount used in each case will be dependent upon the actual molar quantity of either of the two principal starting materials present. For example, as little as one mole by weight of the condensing agent up to about a five molar equivalent can be used for each mole of either of the reactants present. In general, the two principal reactants are employed on a 1:1 molar basis as this is what the reaction calls for, but an excess of up to about 10% of either reactant will not complicate matters and might even be helpful.

Recovery of the desired product in each case from the reaction mixture is readily effected by any number of standard procedures generally familiar to those skilled in the art. For instance, one particularly useful method involves diluting the reaction mixture in question with at least one-half its volume of water and then extracting the separated aqueous layer with a substantially water-immiscible organic solvent such as a lower dialkyl ether or an aromatic hydrocarbon solvent. Evaporation of the combined solvent layer and the extracts affords the condensation product in the form of a crude residual material, which can then be purified by means of recrystallization from a suitable solvent such as ethanol or isopropanol.

In view of the fact that the compounds of this invention are basic in nature, they will form water-soluble salts with the appropriate acids during their isolation and/or subsequent purification steps as outlined in the examples to follow, as well as in preparing aqueous solutions of them for oral or parenteral administration. In practice, it is preferable to employ a strong acid for such purposes in view of the weakly basic nature of the compound which is to be reacted. Although such salts must be pharmaceutically acceptable since the final products are intended for human consumption, it is possible to isolate the desired 3-(pyridyl)acrylonitrile from the reaction mixture in the form of a pharmaceutically unacceptable salt and subsequently convert the latter salt to the free organic compound by treatment with a base; the 3-(pyridyl)acrylonitrile so obtained is then converted to a pharmaceutically acceptable acid addition salt thereof in the manner hereinafter indicated.

For instance, the acid addition salts of the 3-(pyridyl)-acrylonitriles of this invention can be prepared by treating free base with a substantially equimolar amount of the chosen acid in an aqueous solution or in a suitable organic solvent such as methanol or ethanol. Upon careful evaporation of the solvent, the solid salt is obtained. Alternatively, other recovery techniques are also applicable, such as freeze-drying when the solvent is water or the use of an anti-solvent in the case of an organic solution, e.g., the addition of diethyl ether to an ethanolic solution of the product will cause precipitation of the desired product to occur.

The acids which are used to prepare the pharmaceutically acceptable acid addition salts of this invention must, of course, be those which necessarily form non-toxic acid addition salts containing a pharmaceutically acceptable anion, such as the hydrochloride, hydrobromide, hydriodide, nitrate, sulfate or bisulfate, phosphate or acid phosphate, acetate, lactate, citrate or acid citrate, tartrate or bitartrate, oxalate, succinate, maleate, gluconate, saccharate, methanesulfonate, ethanesulfonate, benzenesulfonate and p-toluenesulfonate salts, etc.

The compounds of the present invention are readily adapted to therapeutic use as hypocholesterolemic agents, in addition to being useful as anti-fertility agents in view of their ability to inhibit some of the action of natural estrogenic hormones. Furthermore, the toxicity of these compounds has been found to be quite low when they are administered to mice in amounts that are sufficient to achieve the desired effects. The hypocholesterolemic activity of these particular 3-(pyridyl)acrylonitriles is well illustrated by a series of tests herein employed for just such purposes where normal rats are the experimental test animals used. In these experiments, the normal rats are treated either orally or subcutaneously with the chosen compound at a dosage level of 40 mg. per kg. of body weight per day for a period of six days. At the end of this period, the sera of the animals is analyzed for cholesterol and the amount of said substance found to be present in them is compared via a colorimetric method with the controls that were fed the same diet and treated similarly in all respects except that they did not receive a compound of this invention. In this way, it was found that the compounds of the present invention cause significant reductions in the amount of blood cholesterol present in all treated animals when compared to the controls.

The herein described 3-(pyridyl)acrylonitrile compounds can be administered to a host subject via either the oral or parenteral routes. In general, these compounds are most desirably administered at a dosage level that is in the range of from about 5 mg. up to about 3.0 g. per day, although it is to be understood that variations will necessarily occur depending upon the weight of the subject being treated and the particular route of administration chosen. Nevertheless, a dosage level that is within the range of from about 0.1 mg. to about 50 mg. per kg. of body weight per day is most desirably employed in order to achieve effective results. It is to be appreciated that still other variations may also occur in this respect, depending upon the species of animal being treated and its individual response to said treatment, as well as on the particular type of formulation chosen and the time period and interval at which such administration is carried out. In some instances, dosage levels below the lower limit of the aforesaid range may be more than adequate, while in other cases still larger dosages may be employed without causing any harmful or deleterious side effects provided that such higher dose levels are first divided into several smaller doses that are to be administered throughout the day. For anti-fertility purposes, it is usually only necessary that the present compounds be orally administered at dosage levels which are approximately within the lower quarter of the aforestated range. On the other hand, hypercholesterolemic cases generally tend to require much higher dose levels like those which are nearer to the upper limits of this range. In either case, however, it should be clearly understood that it is the physician who will actually determine the exact amount of drug to be used in each individual instance of treatment.

The acrylonitriles of this invention can be administered either alone or preferably in combination with a pharmaceutically acceptable carrier. Such administration can be carried out in either single or multiple doses. More particularly, the novel compounds of this invention can be administered in a wide variety of different dosage forms, i.e., they may be combined with various pharmaceutically acceptable inert carriers in the form of tablets, capsules, lozenges, troches, hard candies, powders, sprays, aqueous suspensions or solutions, injectable solutions, elixirs, syrups, and the like. Such carriers include solid diluents or fillers, sterile aqueous media and various non-toxic organic solvents. Moreover, the oral pharmaceutical compositions of this invention may be suitably sweetened and flavored by means of various agents of the type commonly employed for just such a purpose. In general, the therapeutically-active compounds of this invention are present in such dosage forms at concentration levels ranging from about 0.5% to about 90% by weight of the total composition, i.e., in amounts which are sufficient to provide the desired unit dosage previously indicated.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia; additionally, lubricating agents such as magnesium stearate, sodium lauryl sulfate and talc are often very useful for tabletting purposes. Solid compositions of a similar type may also be employed as fillers in soft elastic and hard-filled gelatin capsules; preferred materials in this connection also include lactose or milk sugar as well as high molecular weight polyethylene glycols. When aqueous suspensions and/or elixirs are desired for oral administration, the essential active ingredient can be combined with various sweetening and flavoring agents, coloring matter or dyes and, if so desired, emulsifying and/or suspending agents, together with such diluents as water, ethanol, propylene glycol, glycerin and various like combinations thereof.

For purposes of parenteral administration, solutions of the herein described 3-(pydridyl)acrylonitrile bases in sesame or peanut oil or in aqueous-propylene glycol solutions can be employed, as well as sterile aqueous solutions of the corresponding water-soluble acid addition salts previously enumerated. These particular solutions are especially suitable for intramuscular and subcutaneous injection purposes. The aqueous solutions, including those of the acid addition salts dissolved in pure distilled water, are additionally useful for intravenous injection purposes provided that their pH be properly adjusted beforehand. Such solutions should also be suitably buffered, if necessary, and the liquid diluent first rendered isotonic with sufficient saline or glucose. In this connection, the sterile aqueous media employed are readily obtained by standard techniques well-known to those in the art. For instance, distilled water is ordinarily used as the liquid diluent and the final preparation is passed through a suitable bacterial filter, such as a sintered-glass filter or a diatomaceous earth or unglazed porcelain filter. Preferred filters of this type include the Berkefeld, the Chamberland and the asbestos disc-metal Seitz filter, wherein the fluid is sucked throughout the filter candle into a sterile container with the aid of a suction pump. Needless to say, aseptic conditions must necessarily be maintained throughout such operations which are connected with the preparation of these injectable solutions.

This invention is further illustrated by the following examples, which are not to be construed in any way as imposing any limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example 1*

To a warm solution of 20 g. (0.14 mole) of p-methoxyphenylacetonitrile in 200 ml. of benzene there was carefully added 5.46 g. (0.14 mole) of powdered sodamide. After the resulting mixture had been brought to a gentle reflux, 24.8 g. (0.14 mole) of 4-benzoylpyridine dissolved in 150 ml. of benzene was slowly added to the refluxing mixture in a dropwise manner (this step required approximately 15 minutes). Upon completion of the final addition, the resulting reaction mixture was refluxed for an additional 60 minutes. Twenty milliliters of methanol was then added to the cooled solution, followed by the addition of 200 ml. of water. The benzene layer was then separated, and the aqueous layer twice extracted with an equal volume of benzene followed by a single extraction with an equal volume of diethyl ether. The combined benzene layer and benzene-ether extracts was then washed with a saturated aqueous sodium chloride solution and subsequently dried over anhydrous sodium sulfate. After removal of the drying agent by means of filtration and the organic solvent by means of evaporation under reduced pressure, there was obtained 42 g. of a dark colored residual oil. Trituration of the latter substance with diethyl ether yielded 20.14 g. of a white solid material melting at 153–156.5° C. Recrystallization of this crystalline product from ethanol in the presence of charcoal afforded pure 3-(4-pyridyl)-3-phenyl-2-(p-anisyl)acrylonitrile, M.P. 161.166° C.;

$\lambda_{max.}^{EtOH}$ 337 mu ($\epsilon = 11,400$)

Anal.—Calcd. for $C_{21}H_{16}N_2O$: C, 80.75; H, 5.16; N, 8.97. Found: C, 80.34; H, 5.18; N, 8.87.

Example II

The procedure described in Example I is followed except that 20.6 g. (0.14 mole) of p-chlorophenylacetonitrile is used as starting material in place of the p-methoxyphenylacetonitrile of the preceeding example. In this manner, there is obtained 3-(4-pyridyl)-3-phenyl-2-(p-chlorophenyl)acrylonitrile having the following characteristic properties: M.P. 167–169° C.;

$\lambda_{max.}^{EtOH}$ 315.5 mu ($\epsilon = 12,200$)

Anal.—Calcd. for $C_{20}H_{13}ClN_2$: C, 75.82; H, 4.14; N, 8.85. Found: C, 75.76; H, 4.16; N, 9.00.

Example III

The procedure described in Example I is followed except that 15.8 g. (0.14 mole) of phenylacetonitrile is used as starting material in place of the p-methoxyphenylacetonitrile of the aforementioned example. In this manner, there is obtained 3-(4-pyridyl)-3-phenyl-2-phenylacrylonitrile having the following characteristic properties: M.P. 146–148° C.;

$\lambda_{max.}^{EtOH}$ 310 mu ($\epsilon = 11,100$)

Anal.—Calcd. for $C_{20}H_{14}N_2$: C, 85.08; H, 5.00; 9.92. Found: C, 85.13; H, 5.16; N, 9.75.

Example IV

The procedure described in Example I is followed except that 3-benzoylpyridine is used as starting material in place of the corresponding 4-isomer on an equivalent weight basis. In this manner, there is obtained 3-(3-pyridyl)-3-phenyl-2-(p-anisyl)acrylonitrile having the following characteristic properties: M.P. 164–165° C.;

$\lambda_{max.}^{EtOH}$ 335 mu ($\epsilon = 12,100$)

Anal.—Calcd. for $C_{21}H_{16}N_2O$: C, 80.75; H, 5.16; N, 8.97. Found: C, 80.83; H, 5.29; N, 8.95.

Example V

The procedure described in Example II is followed except that 3-benzoylpyridine is used as starting material in place of the corresponding 4-isomer on an equivalent weight basis. In this manner, there is obtained 3-(3-pyridyl)-3-phenyl-2-(p-chlorophenyl)acrylonitrile having the following characteristic properties: M.P. 185–187° C.;

$\lambda_{max.}^{EtOH}$ 316 mu ($\epsilon = 13,150$)

Anal.—Calcd. for $C_{20}H_{13}ClN_2$: C, 75.82; H, 4.14; N, 8.85. Found: C, 75.75; H, 4.14; N, 8.90.

Example VI

The procedure described in Example III is followed except that 3-benzoylpyridine is used as starting material in place of the corresponding 4-isomer on an equivalent weight basis. In this manner, there is obtained 3-(3-pyridyl)-3-phenyl-2-phenylacrylonitrile having the following characteristic properties: M.P. 154.5–157° C.;

$\lambda_{max.}^{EtOH}$ 313 mu ($\epsilon = 12,600$)

Anal.—Calcd. for $C_{20}H_{14}N_2$: C, 85.08; H, 5.00; N, 9.92. Found: C, 85.24; H, 4.97; N, 9.96.

Example VII

The procedure described in Example I is followed except that 2-benzoylpyridine is used as starting material in place of the corresponding 4-isomer on an equivalent weight basis. In this manner, there is obtained 3-(2-pyridyl)-3-phenyl-2-(p-anisyl)acrylonitrile, having the following characteristic properties: M.P. 138–140° C.;

$\lambda_{max.}^{EtOH}$ 333 mu ($\epsilon = 12,650$)

Anal.—Calcd. for $C_{21}H_{16}N_2O$: C, 80.75; H, 5.16; N, 8.97. Found: C, 80.48; H, 5.04; N, 9.21.

Example VIII

The procedure described in Example II is followed except that 2-benzoylpyridine is used as starting material in place of the corresponding 4-isomer on an equivalent weight basis. In this manner, there is obtained 3-(2-pyridyl)-3-phenyl-2-(p-chlorophenyl)acrylonitrile having the following characteristic properties: M.P. 165–167° C.;

$\lambda_{max.}^{EtOH}$ 316 mu ($\epsilon = 12,800$)

Anal.—Calcd. for $C_{20}H_{13}ClN_2$: C, 75.82; H, 4.14; N, 8.85. Found: C, 76.16; H, 4.24; N, 8.95.

Example IX

The procedure described in Example III is followed except that 2-benzoylpyridine is used as starting material in place of the corresponding 4-isomer on an equivalent weight basis. In this manner, there is obtained 3-(2-pyridyl)-3-phenyl-2-phenylacrylonitrile having the following characteristic properties: M.P. 150–151° C.;

$\lambda_{max.}^{EtOH}$ 310 mu ($\epsilon = 11,900$)

Anal.—Calcd. for $C_{20}H_{14}N_2$: C, 85.08; H, 5.00; N, 9.92. Found: C, 84.83; H, 5.12; N, 10.02.

Example X

The procedure described in Example I is used to prepare other 3-(pyridyl)-3-phenyl-2-(ring-substituted)-phenylacrylonitriles by merely substituting the appropriate ring-substituted phenylacetonitrile compound as starting material in place of the p-methoxyphenylacetonitrile of the first example on an equivalent weight basis. In order to avoid unnecessary repetition of experimental detail, these starting materials are listed below as follows:

m-Methylphenylacetonitrile
o-Methoxyphenylacetonitrile
p-(n-propoxy)phenylacetonitrile
p-Methylmercaptophenylacetonitrile
m-Ethylmercaptophenylacetonitrile
o-Fluorophenylacetonitrile
m-Bromophenylacetonitrile
p-Iodophenylacetonitrile
m-Trifluoromethylphenylacetonitrile
m-Nitrophenylacetonitrile
o-Acetylphenylacetonitrile
p-Butyrylphenylacetonitrile

Example XI

The procedure described in Example I is used to prepare other 3-(pyridyl)-3-(p-substituted)phenyl-2-phenylacrylonitriles by merely substituting the appropriate p-substituted benzoylpyridine compound as starting material in place of the corresponding parent compound of the first example on an equivalent weight basis. In order to avoid unnecessary repetition of experimental detail, these particular starting materials are listed below as follows:

4-(p-anisoyl)pyridine
3-(p-ethylbenzoyl)pyridine
2-(p-isopropylbenzoyl)pyridine
4-(p-fluorobenzoyl)pyridine
3-(p-chlorobenzoyl)pyridine
2-(p-bromobenzoyl)pyridine
4-(p-iodobenzoyl)pyridine
3-(p-isopropoxybenzoyl)pyridine

*Example XII*

The procedure described in Example I is used to prepare other 3-(pyridyl)-3-phenyl-2-phenylacrylonitriles where the pyridine moiety is ring-substituted with lower alkyl groups. This is accomplished by employing an appropriately ring-substituted benzoylpyridine compound as starting material in place of the unsubstituted compound on an equivalent weight basis. In order to avoid unnecessary repetition of experimental detail, these particular starting materials are listed below as follows:

4-benzoyl-2-picoline
5-benzoyl-3-picoline
2-benzoyl-4-picoline
4-benzoyl-2-ethylpyridine
6-benzoyl-2,4-lutidine
4-benzoyl-3,6-lutidine
2-benzoyl-4-(n-propyl)pyridine

*Example XIII*

The non-toxic hydrohalide acid addition salts of each of the 3-(pyridyl)-acrylonitrile bases reported in the previous examples, such as the hydrochloride, hydrobromide and hydriodide salts thereof, are prepared by first dissolving the respective 3-(pyridyl)acrylonitrile base in absolute ether followed by introduction of the appropriate hydrogen halide gas into the solution until saturation is complete, whereupon the desired salt precipitates from solution. The crystalline product so obtained is then recrystallized from acetone-ether to yield the pure hydrohalide salt. For instance, when 1.0 g. of 3-(4-pyridyl)-3-phenyl-2-(p-anisyl)acrylonitrile is dissolved in anhydrous diethyl ether and dry hydrogen chloride gas is passed into the resulting solution until saturation of same is complete with respect to said gas, there is obtained a crystalline precipitate of 3-(4-pyridyl)-3-phenyl-2-(p-anisyl)acrylonitrile hydrochloride.

*Example XIV*

The nitrate, sulfate or bisulfate, phosphate or acid phosphate, acetate, lactate, citrate or acid citrate, tartrate or bitartrate, oxalate, succinate, maleate, gluconate and saccharate salts of each of the 3-(pyridyl)acrylonitrile bases reported in the previous examples are all prepared by separately dissolving in a suitable amount of ethanol the proper molar amounts of the respective acid and the appropriate 3-(pyridyl)acrylonitrile base and then mixing the two solutions together, followed by the addition of diethyl ether to the resulting reaction mixture in order to effect precipitation of the desired acid addition salt therefrom. For instance, when equimolar amounts of 3-(2-pyridyl)-3-phenyl-2-phenylacrylonitrile and concentrated sulfuric acid react in accordance with this procedure, the corresponding product obtained is the sulfuric acid addition salt of 3-(2-pyridyl)-3-phenyl-2-phenylacrylonitrile.

*Example XV*

A dry solid pharmaceutical composition is prepared by blending the following materials together in the proportions by weight specified below:

3-(4-pyridyl)-3-phenyl-2-(p-anisyl)acrylonitrile ____ 10
Dicalcium phosphate _____ 45
Potato starch _____ 20
Lactose _____ 15
Polyvinylpyrrolidone _____ 8
Magnesium stearate _____ 2

After the dried composition is thoroughly blended, tablets are punched from the resulting mixture, each tablet being of such size that it contains 50 mg. of the active ingredient.

*Example XVI*

A dry solid pharmaceutical composition is prepared by combining the following materials in the proportions by weight specified below:

3-(2-pyridyl)-3-phenyl-2-phenylacrylonitrile _____ 50
Polyethylene glycol (average molecular weight, 6000) _____ 15
Lactose _____ 25
Calcium carbonate _____ 10

The dried solid mixture so prepared is then thoroughly agitated so as to obtain a powdered product that is completely uniform. Soft elastic and hard-filled gelatin capsules containing this pharmaceutical composition are then subsequently prepared, employing a sufficient quantity of material so as to provide each capsule with 250 mg. of the active ingredient.

*Example XVII*

Using the procedures of Examples X–XII, the following compounds are prepared from the appropriate starting materials:

3-(4-pyridyl)-3-(p-anisyl)-2-(m-bromophenyl)acrylonitrile
3-(2-methyl-4-pyridyl)-3-(p-fluorophenyl)-2-(o-anisyl)-acrylonitrile
3-(3-pyridyl)-3-(p-ethylphenyl)-2-(m-trifluoromethylphenyl)acrylonitrile
3-(5-methyl-3-pyridyl)-3-(p-chlorophenyl)-2-[p-(n-propoxyphenyl)]acrylonitrile
3-(2-pyridyl)-3-(p-bromophenyl)-2-(o-acetylphenyl)-acrylonitrile
3-(4-methyl-2-pyridyl)-3-(p-isopropylphenyl)-2-(m-nitrophenyl)acrylonitrile
3-(4,6-dimethyl-2-pyridyl)-3-phenyl-2-(m-ethylmercaptophenyl)acrylonitrile
3-(3,6-dimethyl-4-pyridyl)-3-(p-anisyl)-2-(p-chlorophenyl)acrylonitrile

What is claimed is:
1. A compound selected from the group consisting of 3-(pyridyl)acrylonitriles represented by the formula:

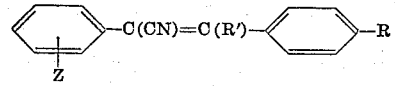

and the pharmaceutically acceptable acid addition salts thereof, wherein Z is a member selected from the group consisting of hydrogen, lower alkyl, lower alkoxy, lower alkylmercapto, halogen, trifluoromethyl, nitro and alkanoyl having from two to four carbon atoms; R' is a member selected from the group consisting of pyridyl and lower alkyl-substituted pyridyl; and R is a member selected from the group consisting of hydrogen, lower alkyl, lower alkoxy and halogen.

2. A compound of claim 1 wherein Z is lower alkoxy, R' is pyridyl and R is hydrogen.

3. A compound of claim 1 wherein Z is lower alkoxy, R' is pyridyl and R is lower alkyl.

4. A compound of claim 1 wherein Z is lower alkoxy, R' is lower alkyl-substituted pyridyl and R is hydrogen.

5. A compound of claim 1 wherein Z is lower alkoxy, R' is lower alkyl-substituted pyridyl and R is lower alkyl.

6. A compound of claim 1 wherein Z is chlorine, R' is pyridyl and R is hydrogen.

7. A compound of claim 1 wherein Z is chlorine, R' is pyridyl and R is lower alkyl.

8. A compound of claim 1 wherein Z is chlorine, R' is lower alkyl-substituted pyridyl and R is hydrogen.

9. A compound of claim 1 wherein Z is chlorine, R' is lower alkyl-substituted pyridyl and R is lower alkyl.

10. A compound of claim 1 wherein Z is hydrogen, R' is pyridyl and R is hydrogen.

11. A compound of claim 1 wherein Z is hydrogen, R' is pyridyl and R is lower alkyl.

12. A compound of claim 1 wherein Z is hydrogen, R' is lower alkyl-substituted pyridyl and R is hydrogen.

13. A compound of claim 1 wherein Z is hydrogen, R' is lower alkyl-substituted pyridyl and R is lower alkyl.

14. 3-(4-pyridyl)-3-phenyl-2-(p-anisyl)acrylonitrile.

15. 3 - (3 - pyridyl) - 3 - phenyl - 2 - (p - chlorophenyl)acrylonitrile.

16. 3-(2-pyridyl)-3-phenyl-2-phenylacrylonitrile.

References Cited in the file of this patent

Castle et al.: "J. Org. Chem.", volume 20, pages 987–9 (1955).

Buu-Hoi et al.: "J. Org. Chem.," volume 20, pages 1407–11 (1955).

Katritzky et al.: "J. Chem. Soc.," 1958 150–3.